United States Patent [19]
Abe

[11] Patent Number: 5,680,177
[45] Date of Patent: Oct. 21, 1997

[54] MULTI-SCREEN TELEVISION RECEIVER TO SIMULTANEOUSLY OUTPUT AND DISPLAY MULTIPLE PICTURES ON A SINGLE SCREEN

[75] Inventor: Hirotoshi Abe, Saitama-ken, Japan

[73] Assignee: Kabushiki Kaisha Toshiba, Kawasaki, Japan

[21] Appl. No.: 616,705

[22] Filed: Mar. 15, 1996

[30] Foreign Application Priority Data

Mar. 17, 1995 [JP] Japan ................................. 7-059302

[51] Int. Cl.$^6$ ................................................. H04N 5/45
[52] U.S. Cl. ........................ 348/564; 348/565; 348/566
[58] Field of Search ............................... 348/563, 564, 348/565, 566, 567, 584, 588, 705, 706, 598, 599; 358/183, 22; H04N 5/45, 9/74, 9/76, 5/268

[56] References Cited

U.S. PATENT DOCUMENTS

| | | | |
|---|---|---|---|
| 4,761,688 | 8/1988 | Hakamada | 348/565 |
| 5,083,205 | 1/1992 | Arai | 348/565 |
| 5,161,019 | 11/1992 | Emanuel . | |
| 5,237,428 | 8/1993 | Kaneko . | |
| 5,363,143 | 11/1994 | Duffield . | |

FOREIGN PATENT DOCUMENTS

| | | |
|---|---|---|
| 6121278 | 4/1994 | Japan . |
| 2 260 873 | 4/1993 | United Kingdom . |
| 2 262 201 | 6/1993 | United Kingdom . |

*Primary Examiner*—Sherrie Hsia
*Attorney, Agent, or Firm*—Cushman Darby & Cushman IP Group of Pillsbury Madison & Sutro LLP

[57] ABSTRACT

A multi-screen television receiver which can display first and second video signals on a picture tube as a main picture screen and a sub-picture screen adjacent to each other, includes a video input switching circuit for selectively outputting a first input video signal associated with the main picture screen and a second input video signal associated with the sub-picture screen from a plurality of video signals, first and second video processing systems for the main picture and sub-picture screens for processing the luminance and the color of the first and second video signals from the video input switching circuit, first and second scaling-down arrangements for scaling down the pictures of the output signals of the first and second video processing systems to the sizes of the main picture and sub-picture screens, a combiner for combining selected output signals from the first and second processing systems to supply the combined signal to the picture tube, an encoder for encoding the combined signal from the combiner into a third video signal to be recorded, and a video output switching circuit for selectively outputting one of the first through third video signals through a video output terminal.

10 Claims, 8 Drawing Sheets

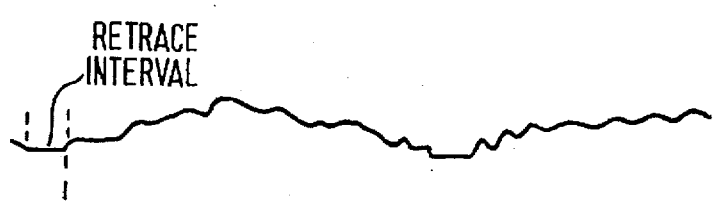
FIG. 12a VIDEO SIGNAL FROM VIDEO PROCESSOR 95
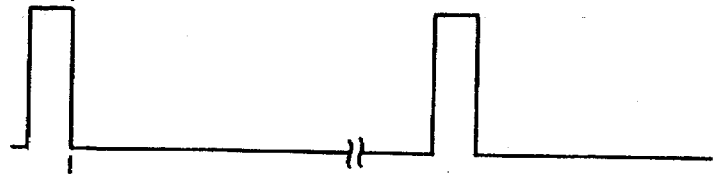
FIG. 12b WRITE-IN HORIZONTAL TIMING SIGNAL a7
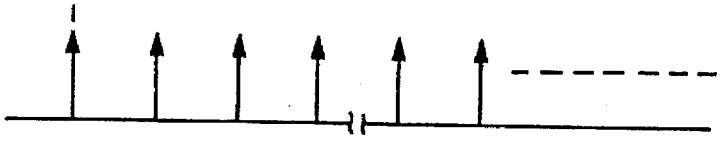
FIG. 12c WRITE-IN CLOCK b7
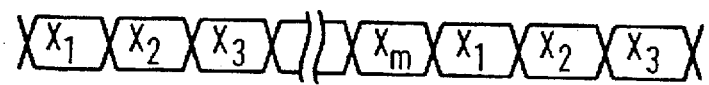
FIG. 12d DIGITAL SIGNAL e7
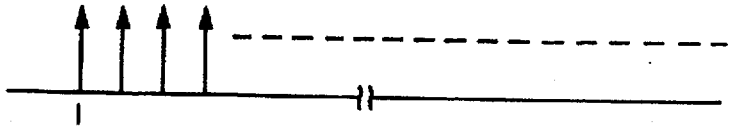
FIG. 12e READ-OUT CLOCK d7
FIG. 12f DIGITAL SIGNAL f7
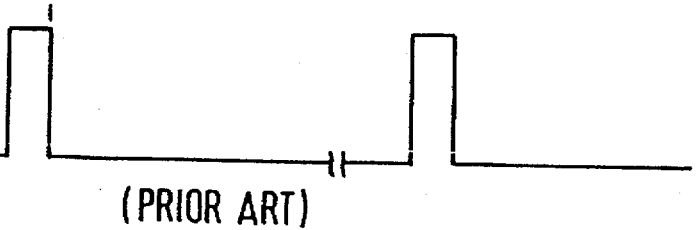
FIG. 12g READ-OUT HORIZONTAL TIMING SIGNAL c7
(PRIOR ART)

1

MULTI-SCREEN TELEVISION RECEIVER TO SIMULTANEOUSLY OUTPUT AND DISPLAY MULTIPLE PICTURES ON A SINGLE SCREEN

FIELD OF THE INVENTION

The present invention generally relates to a multi-screen television receiver capable of simultaneously displaying a main picture screen and a sub-picture screen, more particularly to a multi-picture screen which is suitable to link with a video recording apparatus such as a VCR.

BACKGROUND OF THE INVENTION

Recently on sale is a television receiver capable of displaying a second picture screen (small screen) in addition to that an ordinary picture image (large screen). Further, as being represented by a HDTV (high definition TV) or EDTV, there are more television receivers equipped with a color picture tube (hereinafter referred to as CPT) of a wide aspect (wide screen in the horizontal direction). Under such a background, a multi-screen display system (a display pattern for displaying multi-screens on a display tube screen) peculiar to the television receiver (wide aspect television receiver) equipped with the CPT of the wide aspect ratio is developed. Some examples of the conventional wide aspect television receivers will be explained hereinafter.

FIG. 6 is a diagram showing a first conventional multi-screen display system.

In FIG. 6, displayed on the CPT 201 having a wide aspect ratio (the ratio of the vertical size to the horizontal size of the picture screen) of 9:16 are a normal aspect ratio main picture image 202 having the aspect ratio of 3:4 and three sub-picture images 203 at one ninth the size of the image 202 which are located on the right side of the image 202.

Such a first multi-screen display system has a drawback in that, although the main picture image 202 is displayed in a sufficient size, the sub-picture images 203 are too small for viewers to watch or to provide sufficient resolution.

FIG. 7 is a diagram showing a second conventional multi-screen display system.

In FIG. 7, two same size picture images 205, 205 each having an aspect ratio of 9:16 are scaled down to two thirds in the horizontal direction, then two scaled-down picture images 205, 205 thus shaped to the aspect ratio of 9:8 viewing in the vertically elongated shapes are displayed side by side on the CPT 204 having a wide aspect ratio of 9:16.

Such a second conventional multi-screen display system has a drawback in that although the two picture images 205, 205 are displayed in sufficient size, the picture images 205, 205 having the vertically elongated in shape which gives viewers an unnatural impression.

FIG. 8 is a diagram showing a third conventional multi-screen display system.

In FIG. 8, two normal aspect ratio picture images 207, 207, each having an aspect ratio of 9:16, have both of their sides cut down by two ninths. Then these two picture images 207, 207, thus shaped to the aspect ratio of 9:8, are displayed side by side on the CPT 206 having a wide aspect ratio of 9:16.

Such a third conventional multi-screen display system has a drawback in that although the two picture images 207, 207 are displayed in sufficient size compared with the pictures in FIG. 7 and the picture images are not deformed in the vertical and horizontal directions, information on both sides is lost.

2

FIG. 9 is a diagram showing a fourth conventional multi-screen display system.

In FIG. 9, two normal aspect ratio picture images 209, 209, each having an aspect ratio of 3:4, are scaled down in the vertical and horizontal directions to two thirds respectively. Similarly, the picture area of the CPT 208, having a wide aspect ratio of 9:16, is scaled down to two third in the vertical direction. Thus, the two picture images 209, 209 scaled down to two thirds in the vertical direction are displayed side by side on the CPT 208. Therefore, two non-picture areas 210, 210 occur above and below the two picture images 209, 209.

Such a fourth conventional multi-screen display system has a drawback in that although the two picture images 209, 209 are displayed in sufficient size and the two picture images 209, 209 are not deformed in the vertical and horizontal directions, the non-picture areas 210, 210 also give viewers an unnatural impression.

FIG. 10 is a block diagram showing the construction of the conventional multi-picture screen television receiver adapted for displaying two picture screens, as shown in FIG. 7.

In FIG. 10, a television receiver 7 receives a broadcasting signal at a radio frequency (RF signal).

The RF signal received through an antenna 71 of the television receiver 7 is supplied to two RF signals associated with a main picture screen and a sub-picture screen through a distributor 72. The first RF signal associated with the main picture screen is supplied to a tuner 73 to be converted into an intermediate frequency (IF) video signal and a multiplexed FM audio signal. Then the IF video signal is amplified and detected in an intermediate frequency (IF) circuit 74 to be converted into a composite video signal associated with the main picture screen. The composite video signal associated with the main picture screen is supplied to a first composite video signal input terminal of an A/V switching circuit 75. The multiplexed FM audio signal which has passed through the IF circuit 74 is demultiplexed in a demultiplexer 76. The L (left) channel and R (right) channel audio signals demultiplexed in the demultiplexer 76 are supplied to a first set of right and left channel audio signal input terminals of the A/V switching circuit 75.

To a second composite video signal input terminal and other composite video signal input terminals (not shown) of the A/V switching circuit 75, composite video signals are supplied from external input terminals connected to external devices such as a satellite broadcasting tuner, a video tape recorder or an optical record medium reproducing apparatus.

To a second set of right channel and left channel audio signal input terminals and other sets of right channel and left channel audio signal input terminals (not shown) of the A/V switching circuit 75, right channel and left channel audio signals are supplied from external input terminals connected to external devices such as a satellite broadcasting tuner, a video tape recorder or an optical record medium reproducing apparatus.

The A/V switching circuit 75 selects one composite video signal input terminal from a plurality of composite video signal input terminals by a key operation on a remote controller to supply the composite video signal on the selected composite video signal input terminal to first input terminals of a video processor 77, a sync signal separator 78 and a video output switching circuit 79. The A/V switching circuit 75 also selects pair of right channel and left channel audio signal input terminals from plural pairs of right channel and left channel audio signal input terminals by interlocked with the selected composite video signal input terminal to supply the audio signals on the selected pair of right channel and left channel audio signal input terminals to first input terminals of an audio output switching circuit 80 and a speaker switching circuit 110.

The sync signal separator 78 separates horizontal and vertical sync signals from the supplied composite video signal to supply them to a deflection controller 81. The sync signal extractor 78 then supplies a read-out timing signal to a memory controller 90 for the sub-picture screen based on the extracted horizontal and vertical sync signals, The deflection controller 81 supplies a saw tooth wave current for causing a horizontal deflection and a vertical deflection to a deflection coil 83 of a CPT 82 based on the supplied horizontal and vertical sync signals so that the CPT 82 carries out the horizontal and vertical scannings.

The video processor 77 carries out a Y/C separation for dividing the supplied composite video signal to a luminance signal component and a color difference signal component as well as a color demodulation.

The luminance signal and the color difference signal from the video processor 77 are converted into digital signals in an A/D converter 84 to be written in a memory 85 and then read out therefrom, The write-in and read-out operations are controlled by a memory controller 86 for scaling down the time axis of the picture in the horizontal direction to one half. The scaled-down signals are converted into analog signals in a D/A converter 87 and then supplied to a switch 88.

The RF signal associated with the sub-picture screen is converted into a composite video signal associated with the sub-picture screen in a tuner 91 and an IF circuit 92 in the same way as that of the main picture screen, The composite video signal associated with the sub-picture screen is supplied to a first composite video signal input terminal of an A/V switching circuit 93. The multiplexed FM audio signal which has passed through the IF circuit 92 is demultiplexed in a demultiplexer 94. The L (left) channel and R (right) channel audio signals demultiplexed in the demultiplexer 94 are supplied to a first set of right channel and left channel audio signal input terminals of the A/V switching circuit 93.

To a second composite video signal input terminal or other composite video signal input terminals (not shown) of the A/V switching circuit 93, composite video signals are supplied from external input terminals connected to external devices such as a satellite broadcasting tuner, video tape recorder or optical record medium reproducing apparatus.

To a second set of right channel and left channel audio signal input terminals or other sets of right channel and left channel audio signal input terminals (not shown) of the A/V switching circuit 93, right channel and left channel audio signals are supplied from external input terminals connected to external devices such as a satellite broadcasting tuner, video tape recorder or optical record medium reproducing apparatus.

The A/V switching circuit 93 selects one composite video signal input terminal from a plurality of composite video signal input terminals by a key operation on a remote controller for supplying a composite video signal on the selected composite video signal input terminal to a video processor 95, a sync signal extractor 96 and a second input terminal of the video output switching circuit 79. The A/V switching circuit 93 also selects a pair of right channel and left channel audio signal input terminals from plural pairs of right channel and left channel audio signal input terminals by interlocked with the selected composite video signal input terminal for supplying audio signals on the selected pair of right channel and left channel audio signal input terminals to an audio output switching circuit 80 and a second input terminal of a speaker switching circuit 110.

The sync signal extractor 96 extracts horizontal and vertical sync signals from the supplied composite video signal for supplying a write-in timing signal to a memory controller 90 for the sub-picture screen based on the extracted horizontal and vertical synchronous signals.

The video processor 95 carries out a Y/C separation and a color demodulation to the supplied composite video signal so as to divide it into a luminance signal component signal and a color difference signal component.

The luminance signal and the color difference signal from the video processor 95 are converted into digital signals in an A/D converter 97 to be written in a memory 98 and then read out therefrom, The write-in and read-out operations are controlled by the memory controller 90 so as that the write-in operation accords with a write-in clock from the sync signal extractor 96 while the read-out operation accords with a read-out clock from the sync signal extractor 78, Thus the luminance signal and the color difference signal are scaled down in their time axes in the horizontal direction to one half in synchronism with the sync signal associated with the main picture screen. The scaled-down signals are converted into respective analog signals in a D/A converter 99 to be supplied to the switch 88.

The signals associated with the main picture and sub-picture screen from the D/A converters 87, 99 are switched at a high speed to be multiplexed with each other in the switch 88 operating as a multiplexing means. Then the luminance signal and the color difference signal are converted into R, G and B signals in an RGB matrix circuit 100 to be displayed as two picture screens in the CPT 82. The CPT 82 used in the embodiment has an aspect ratio of 16:9.

The speaker switching circuit 110 selects the pair of the right channel and left channel audio signals associated with the main audio signal from the A/V switching circuit 75 or the pair of the right channel and left channel audio signals associated with the sub-audio signal from the A/V switching circuit 93 to supply the selected pair of audio signals to an audio amplifier 111. The audio amplifier 111 amplifies the supplied pair of the right channel and left channel audio signals in order to output them from speakers 112, 113.

The video output switching circuit 79 selects one of the composite video signal associated with the main audio signal from the A/V switching circuit 75 and the composite video signal associated with the sub-audio signal from the A/V switching circuit 93 to supply the selected composite video signal to an output terminal 114.

The audio output switching circuit 80 is interlocked to the video output switching circuit 79 to select the pair of the right channel and left channel audio signal associated with the main audio signal from the A/V switching circuit 75 or the pair of the right channel and left channel audio signal associated with the sub-audio signal from the A/V switching circuit 93 to supply the selected pair of the audio signals to right channel and left channel output terminals 115, 116.

FIG. 11 is a block diagram showing an arrangement of the memory controller 90 and the memory 98 in FIG. 10. To simplify the explanation, a circuit for carrying out the write-in and read-out operations for one horizontal line signal will be explained hereinafter.

In FIG. 11, a horizontal write-in timing signal a7 from the sync signal extractor 96 is supplied to the memory 98 and an oscillator 131. The oscillator 131 oscillates at a frequency of m times that of the write-in timing signal a7 to supply the oscillation signal to the memory 98 as a write-in clock signal b7.

A horizontal read-out timing signal c7 from the sync signal extractor 78 is supplied to the memory 98 and an oscillator 132. The oscillator 132 oscillates with frequencies 2 m times as much as the read-out timing signal to supply the oscillation signal to the memory 98 as a read-out clock signal d7.

The memory 98 is reset to its write-in starting area to the starting area of the horizontal line by the horizontal write-in timing signal a7. Written in the memory 98 is a digital signal e7 which is A/D-converted from the video signal associated with the sub-picture screen from the A/D converter 97 in synchronism with the write-in clock b7. The memory 98 is then reset to the read-out position of its recording area by the horizontal read-out timing signal c7. Thus a digital signal f7 is read out from the memory 98 in synchronism with the read-out clock d7 to be supplied to the D/A converter 99.

FIG. 12 is a timing chart showing an operation of the circuit, as shown in FIG. 11. In more detail, FIG. 12a indicates the video signal from the video processor 95. FIG. 12b also indicates the horizontal write-in timing signal a7. FIG. 12c also indicates the write-in clock b7. FIG. 12d also indicates the write-in data of the digital signal e7. FIG. 12e also indicates the read-out clock d7. FIG. 12f indicates the read-out data of the digital signal f7. FIG. 12g indicates the horizontal read-out timing signal c7.

The horizontal write-in timing signal a7, as shown in FIG. 12b, is synchronized with a retrace line period of the video signal from the video processor 95 for the sub-picture screen, as shown in FIG. 12a. The horizontal read-out timing signal c7, as shown in FIG. 12g, is shifted one half horizontal interval from a retrace line period of the video signal from the video processor 77 for the main picture screen (not shown). The read-out clock d7, as shown in FIG. 12e has a frequency twice that of the write-in clock b7, as shown in FIG. 12c.

The memory 98 is reset to the write-in starting position on its recording area when the horizontal write-in timing signal a7 goes to a pulse interval. The memory 98 is then written with data X1, X2, X3 ... Xm of the digital signal e7 from the A/D converter 97 in synchronism with the write-in clock b7, as shown in FIG. 12c. The memory 98 is then reset to the read-out starting position on its recording area the horizontal read-out timing signal c7, as shown in FIG. 12g. Thus the data X1, X2, X3 ... Xm of the digital signal e7 are read out from the memory 98 in synchronism with the read-out clock d7, as shown in FIG. 12e. Therefor, the time axis of the read-out data X1, X2, X3 ... Xm of the digital signal e7 are scaled down.

Here, although it is not illustrated in FIGS. 11, 12, the memory 98 has a memory capacity for one frame. Thus, a horizontal line area for starting the write-in operation can be reset to the beginning horizontal line area by a vertical write-in timing signal for odd fields. Also the horizontal line area for starting the read-out can be reset to the beginning horizontal line area by a vertical read-out timing signal for odd fields.

Such a conventional multi-picture screen television receiver can display two picture screens on the CPT, and permits selecting one of the main picture and sub-picture screens by switching between the video output switching circuit 79 and the audio output switching circuit 80 so as to record the composite video signal and the right channel and left channel audio signals to the recording device such as a video tape recorder connected to the output terminals 114, 115 and 116.

However, since only one of the main picture and sub-picture screens can be recorded to the recording device, it is impossible to record the composite video signals or the audio signals of both the main picture and sub-picture screens together.

As described above, the conventional multi-picture screen television receiver can display two picture screens on the picture tube, and permit selection of one of the main picture and sub-picture screens by selectively outputting the video output switching circuit and the audio output switching circuit so as to record the composite video signal and the right channel and left channel audio signal to the recording device such as a video tape recorder which is connected to the output terminals. However, since only one of the main picture and sub-picture screens can be recorded to the recording device, it is impossible for the conventional multi-picture screen television receiver to record the composite picture images or the audio signals of both the main picture and sub-picture screens together.

SUMMARY OF THE INVENTION

It is, therefore, an object of the present invention to provide a multi-screen television receiver which can record picture images and audio signals for both the main picture and sub-picture screens in the recording device together.

The multi-screen television receiver according to the first aspect of the present invention, which is capable of displaying first and second video signals on a picture tube as a main picture screen and a sub-picture screen next to each other, includes a video input switching circuit for selectively outputting a first input video signal associated with the main picture screen and a second input video signal associated with the sub-picture screen from a plurality of video signals, first and second video processing systems for the main picture and sub-picture screens for processing the luminance and the color of the first and second video signals from the video input switching circuit, first and second scaling-down arrangements for scaling down the pictures of the output signals of the first and second video processing systems to the sizes of the main picture and sub-picture screens, a combiner for combining selected output signals from the first and second processing systems to supply the combined signal to the picture tube, an encoder for encoding the combined signal from the combiner into a third video signal to be recorded, and a video output switching circuit for selectively outputting one of the first through third video signals through a video output terminal.

The multi-screen television receiver according to the second aspect of the present invention, which is capable of displaying first and second video signals on a picture tube as a main picture screen next to and a sub-picture screen each other and selects one of first and second right channel and left channel audio signals as a right channel and left channel audio signal associated with main picture screen and a right channel and left channel audio signal associated with sub-picture screen and outputs, includes a video input switching circuit for selectively outputting a first input video signal associated with the main picture screen and a second input video signal associated with the sub-picture screen from a plurality of video signals, first and second video processing systems for the main picture and sub-picture screens for processing the luminance and the color of the first and second video signals from the video input switching circuit, first and second scaling-down arrangements for scaling down the pictures of the output signals of the first and second video processing systems to the sizes of the main picture and sub-picture screens, a combiner for combining selected output signals from the first and second processing systems to supply the combined signal to the picture tube, an encoder for encoding the combined signal from the combiner into a third video signal to be recorded, a video output switching circuit for selectively outputting one of the first through third video signals through a video output terminal, an audio input switching circuit for selectively outputting the right channel and left channel audio signals associated with the main picture screen and the right channel and left channel audio signals associated with the sub-picture screen from a plurality of right channel and left channel input audio signals, a monophonic converter for converting the right channel and left channel audio signals for the main picture and sub-picture screens from the audio input switching circuit into monophonic audio signals for the main picture and sub-picture screens, and an audio output switching circuit for selectively outputting one of the first through third combinations, where the first combination comprises the right channel and left channel audio signals associated with the main picture screen from the audio input switching circuit, the second combination comprises the right channel and left channel audio signals associated with sub-picture screen from the audio input switching circuit and the third combination comprises the monophonic audio signal for the main picture and sub-picture screens from the monophonic converter, to output the selected one through an audio output terminal.

According to the construction of the first aspect of the present invention, since the encoder performs encode processing on the combination signal which is combined of the outputs for the main picture and sub-picture screens from the first and the second scaling-down arrangements to the third video signal to be recorded, and the video output switching circuit selects one of the first through the third video signals to output the selected one through the video output terminal, it is possible to record both the main picture and sub-picture screens to the recording device connected to the video output terminal together.

According to the construction of the second aspect of the present invention, since the encoder performs encode processing on the combined signal which is combination of the outputs for the main picture and sub-picture screens from the first and the second scaling-down arrangements to the third video signal to be recorded and the video output switching circuit selects one of the first through the third video signals to output the selected one through the video output terminal, it is possible to record both the main picture and sub-picture screens to the recording device connected to the video output terminal together. Furthermore, since the monophonic converter converts the right channel and left channel audio signals for the main picture and sub-picture screens to the monophonic audio signals for the main picture and sub-picture screens and the audio output switching circuit selects one of the first through third combinations where the third combination includes the monophonic audio signals for the main picture and sub-picture screens from the monophonic converter to output the selected combination though the audio output terminal, it is possible to record the audio signals for the main picture and sub-picture screens to the recording device connected to the audio output terminal together.

Additional objects and advantages of the present invention will be apparent to persons skilled in the art from a study of the following description and the accompanying drawings, which are hereby incorporated in and constitute a part of this specification.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein:

FIGS. 12a through 12g are timing charts showing the operation of the circuit in FIG. 11.

DESCRIPTION OF THE PREFERRED EMBODIMENTS

The present invention will be described in detail with reference to FIGS. 1 through 5.

Figure 1:
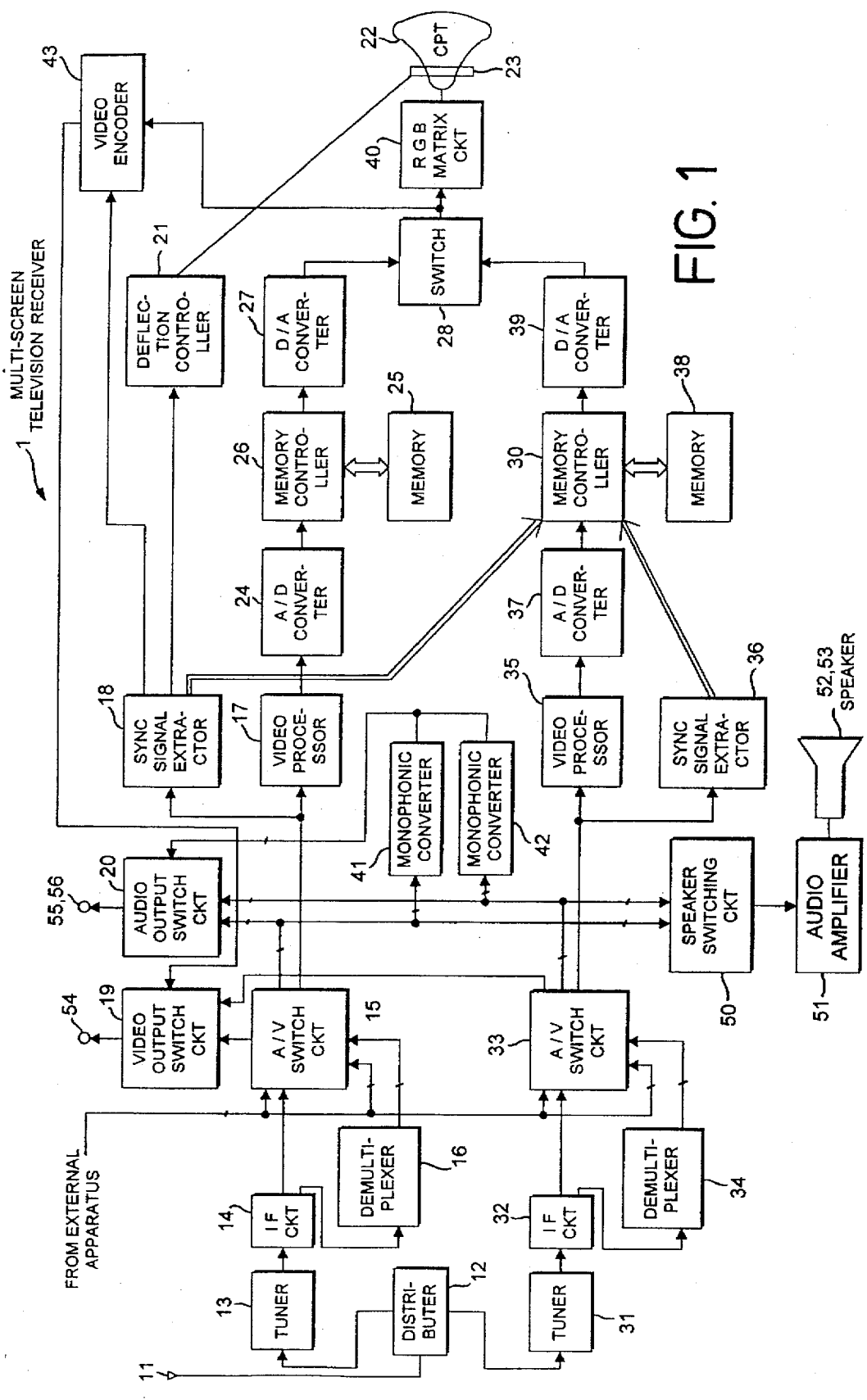
FIG. 1 is a block diagram showing one embodiment of the multi-screen television receiver according to the present invention.

FIG. 1 is a block diagram showing one embodiment of the multi-screen television receivers according to the present invention.

In FIG. 1, a multi-screen television receiver 1 receives a broadcasting signal at a radio frequency (RF signal).

The RF signal received through an antenna 11 of the multi-screen television receiver 1 is supplied to two RF signals associated with a main picture screen and a sub-picture screen through a distributor 12. The first RF signal associated with the main picture screen is supplied to a tuner 13 to be converted into an intermediate frequency (IF) video signal and a multiplexed FM audio signal. Then the IF video signal is amplified and detected in an intermediate frequency (IF) circuit 14 to be converted into a composite video signal associated with the main picture screen. The composite video signal associated with the main picture screen is supplied to a first composite video signal input terminal of an A/V switching circuit 15. The multiplexed FM audio signal which has passed through the IF circuit 14 is demultiplexed in a demultiplexer 16. The L (left) channel and R (right) channel audio signals demultiplexed in the demultiplexer 16 are supplied to a first set of right and left channel audio signal input terminals of the A/V switching circuit 15.

To a second composite video signal input terminal and other composite video signal input terminals (not shown) of the A/V switching circuit 15, composite video signals from external input terminals connected to external devices such as a satellite broadcasting tuner, a video tape recorder or an optical record medium reproducing apparatus are supplied.

To a second set of right channel and left channel audio signal input terminals or other sets of right channel and left channel audio signal input terminals (not shown) of the A/V switching circuit 15 right channel and left channel audio signals from external input terminals connected to external devices such as a satellite broadcasting tuner, a video tape recorder or an optical record medium reproducing apparatus are supplied.

The A/V switching circuit 15 selects one composite video signal input terminal from a plurality of composite video signal input terminals by a key operation on a remote controller to supply the composite video signal on the selected composite video signal input terminal to first input terminals of a video processor 17, a sync signal extractor 18 and a video output switching circuit 19. The A/V switching circuit 15 also selects a pair of right channel and left channel audio signal input terminals from a plural pairs of right channel and left channel audio signal input terminals by interlocked with the selected composite video signal input terminal to supply the audio signals on the selected pair of right channel and left channel audio signal input terminals to first input terminals of an audio output switching circuit 20 and a speaker switching circuit 50, and further to a monophonic converter 41.

The sync signal extractor 18 extracts horizontal and vertical sync signals from the supplied composite video signal to supply them to a video encoder 43 and a deflection controller 21. The sync signal extractor 18 also supplies a read-out timing signal to a memory controller 30 for the sub-picture screen based on the extracted horizontal and vertical synchronous signals. Furthermore, the sync signal extractor 18 supplies read-out and write-in timing signals (not shown) to a memory controller 26 for the main picture screen based on the extracted horizontal and vertical sync signals.

The deflection controller 21 supplies saw tooth wave currents for causing a horizontal deflection and a vertical deflection to a deflection coil 23 of a color picture tube (CPT) 22 based on the supplied horizontal and vertical sync signals so that the CPT 22 carries out the horizontal and vertical scannings.

The video processor 17 carries out a Y/C separation and a color demodulation on the supplied composite video signal so as to divide it into a luminance signal component and a color difference signal component.

The luminance signal and the color difference signal from the video processor 17 are converted into digital signals in an A/D converter 24 to be written in a memory 25 and then read out therefrom. The write-in and read-out operations are controlled by a memory controller 26 to scale down the time axis of the picture in the horizontal direction to one half. The scaled-down signals are then converted into analog signals in a D/A converter 27 and then supplied to a switch 28. The A/D converter 24, the memory 25, the memory controller 26 and the D/A converter 27 constitute a first scaling-down arrangement.

The RF signal associated with the sub-picture screen is converted into a composite video signal associated with the sub-picture screen in a tuner 31 and an IF circuit 32 in the same way as that of the main picture screen. The composite video signal associated with the sub-picture screen is supplied to a first composite video signal input terminal of an A/V switching circuit 33. The multiplexed FM audio signal which has passed through the IF circuit 32 is demultiplexed in a demultiplexer 34. The L (left) channel and R (right) channel audio signals demultiplexed in the demultiplexer 34 are supplied to a first set of right channel and left channel audio signal input terminals of the A/V switching circuit 33.

To a second composite video signal input terminal or other composite video signal input terminals (not shown) of the A/V switching circuit 33, composite video signals from external input terminals connected to external devices such as a satellite broadcasting tuner, video tape recorder or optical record medium reproducing apparatus are supplied.

To a second set of right channel and left channel audio signal input terminals or other sets of right channel and left channel audio signal input terminals (not shown) of the A/V switching circuit 33, right channel and left channel audio signals from external input terminals connected to external devices such as a satellite broadcasting tuner, video tape recorder or optical record medium reproducing apparatus are supplied.

The A/V switching circuit 33 has two functions as the video input switching arrangement and the audio input switching arrangement for the sub-picture screen. Then the A/V switching circuit 33 selects one composite video signal input terminal from a plurality of composite video signal input terminals by a key operation on a remote controller for supplying a composite video signal on the selected composite video signal input terminal to a video processor 35, a sync signal extractor 36 and a second input terminal of the video output switching circuit 19. The A/V switching circuit 33 also selects a pair of right channel and left channel audio signal input terminals from a plural pairs of right channel and left channel audio signal input terminals by interlocked with the selected composite video signal input terminal for supplying audio signals on the selected pair of right channel and left channel audio signal input terminals to an audio output switching circuit 20 and a second input terminal of a speaker switching circuit 50 and a monophonic converter 42.

The sync signal extractor 36 extracts horizontal and vertical sync signals from the supplied composite video signal to supply a write-in timing signal to a memory controller 30 for the sub-picture screen based on the extracted horizontal and vertical sync signals.

The video processor 35 carries out a Y/C separation and a color demodulation to the supplied composite video signal so as to divide it into a luminance signal component signal and a color difference signal component.

The luminance signal and color difference signal from the video processor 35 are converted into digital signals in an A/D converter 37 to be written into a memory 38 and then read out therefrom. The write-in and read-out operations are controlled by the memory controller 30 so as that the write-in operation accords with a write-in clock from the sync signal extractor 36 while the read-out operation accords with a read-out clock from the sync signal extractor 18. Thus, the time axes of the luminance signal and the color difference signal are scaled down in the horizontal direction to one half in synchronism with the sync signal associated with the main picture screen. The scaled-down signals are converted into respective analog signals in a D/A converter 39 to be supplied to the switch 28. The A/D converter 37, the memory 38, the memory controller 30 and the D/A converter 39 construct a second scaling-down arrangement.

The signal associated with the main picture screen and the signal associated with the sub-picture screen from the D/A converters 27, 39 are switched at a high speed to be multiplexed with each other in the switch 28 operating as a multiplexing arrangement, then the luminance signal and the color difference signal are converted into R, G and B signals in an RGB matrix circuit 40 to be parallelly displayed as two picture screens in the CPT 22. The CPT 22 used in the embodiment has an aspect ratio of 16:9. The luminance signal and the color signal from the switch 28 are supplied to the video encoder 43.

The speaker switching circuit 50 selects the pair of the right channel and left channel audio signals associated with the main audio signal from the A/V switching circuit 15 or the pair of the right channel and left channel audio signals associated with the sub-audio signal from the A/V switching circuit 33 to supply the selected pair of audio signals to an audio amplifier 51. The audio amplifier 51 amplifies the supplied pair of the right channel and left channel audio signals for output from speakers 52, 53.

The monophonic converter 41 generates a monophonic audio signal associated with the main picture screen by combining the right channel and left channel audio signal signals associated with the main picture screen from the A/V switching circuit 15 together to supply the monophonic audio signal to the audio output switching circuit 20.

The monophonic converter 42 generates a monophonic audio signal associated with the sub-picture screen by combining the right channel and left channel audio signals associated with the main picture screen from the A/V switching circuit 33 together to supply the monophonic audio signal to the audio output switching circuit 20.

The video encoder 43 produces a multi-screen video signal for parallelly displaying the main picture and sub-picture screens from the luminance signal and the color signal from the switch 28 and the horizontal and vertical sync signals from the sync signal extractor 18 to output the multi-screen video signal to the video output switching circuit 19.

The video output switching circuit 19 selects one of the composite video signal associated with the main audio signal from the A/V switching circuit 15, the composite video signal associated with the sub-audio signal from the A/V switching circuit 33 and the multi-screen video signal from the video encoder 43, to supply to an output terminal 54.

The audio output switching circuit 20 is interlocked with the video output switching circuit 19, and it selects one combination from a first through third combinations, where the first combination comprises the right channel and left channel audio signal associated with the main picture screen from the A/V input switching circuit 15, the second combination comprises the right channel and left channel audio signal associated with the sub-picture screen from the A/V input switching circuit 33 and the third combination comprises the monophonic audio signals for the main picture and sub-picture screens from the monophonic converters 41, 42 to output the selected one through audio output terminals 55, 56.

Figure 2:
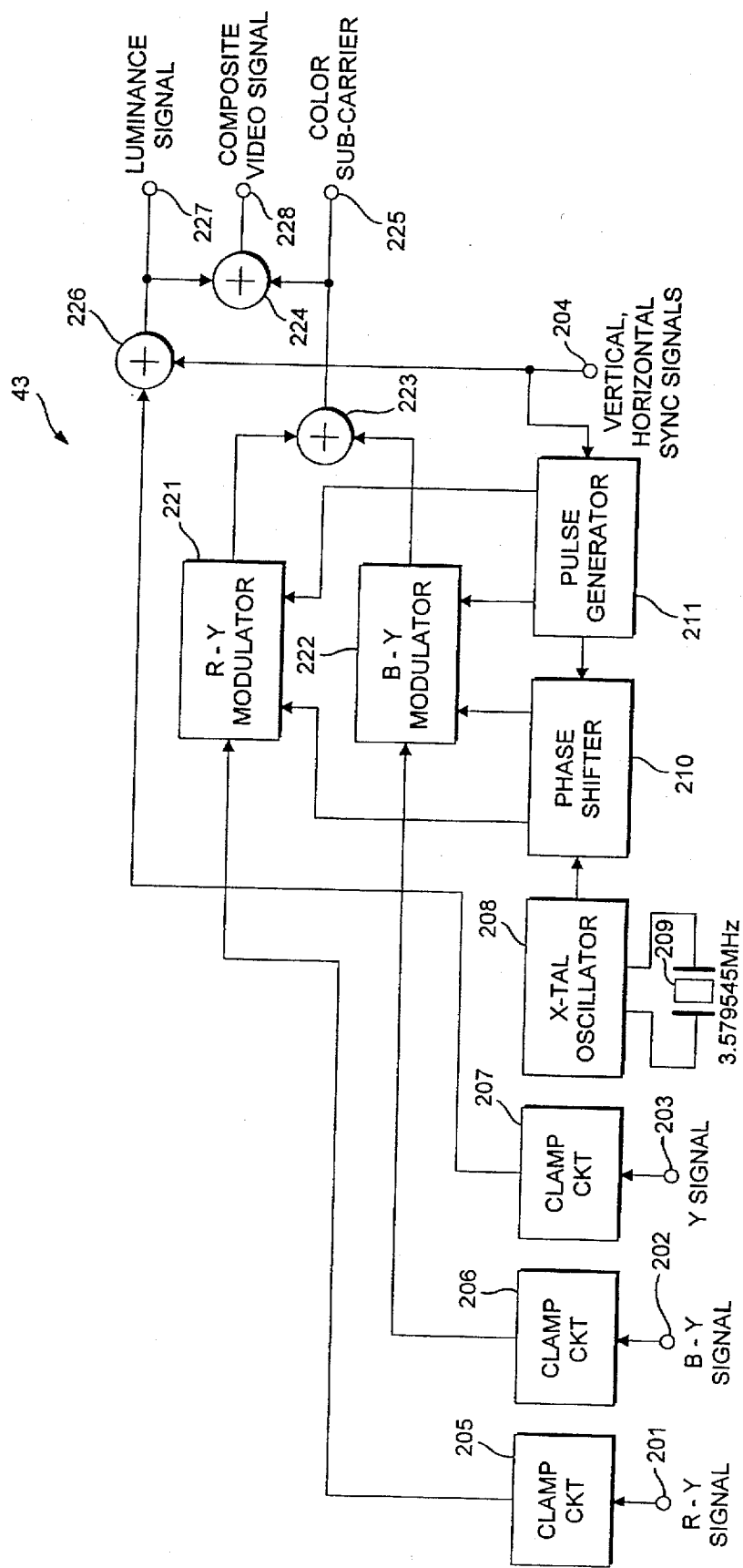
FIG. 2 is a block diagram showing the video encoder 43 in FIG. 1 in more detail

FIG. 2 is a block diagram showing the video encoder 43, as shown in FIG. 1, in more detail.

In FIG. 2, a R-Y signal, a B-Y signal and a Y signal from the switch 28 are led to input terminals 201, 202 and 203 of the video encoder 43. On the other hand, the horizontal and vertical sync signal from the sync signal extractor 18 is led to an input terminal 204 of the video encoder 43.

The R-Y signal and the B-Y signal led to the input terminals 201, 202 are clamped in clamp circuits 205, 206 and supplied to a R-Y modulator 221 and a B-Y modulator 222.

In a crystal oscillator 208 a crystal resonator 209 generates 3.57945 MHz oscillation signal to supply the oscillation signal to a phase shifter 210.

The horizontal and vertical sync signals led to the input terminal 204 are supplied to a pulse generator 211. The pulse generator 211 generates a pulse signal showing a retrace line period from the horizontal and vertical sync signal to supply it to a phase shifter 210, a R-Y modulator 221 and a B-Y modulator 222.

The phase shifter 210 has no signal in the retrace line period based on an oscillation signal from the crystal oscillator 208 and the pulse signal from the pulse generator 211, to supply color subcarrier's having different phases in 90 degrees to the R-Y modulator 221 and the B-Y modulator 222 in the trace interval.

The R-Y modulator 221 modulates the R-Y signal from the clamp circuit 205 by the color subcarrier from the phase shifter 210 so that the modulated signal goes to no signal state in the retrace line period based on the pulse signal from the pulse generator 211 so as to be supplied to an adder 223.

The B-Y modulator 222 modulates the B-Y signal from the clamp circuit 206 by the color subcarrier from the phase shifter 210 so that the modulated signal goes to no signal state in the retrace line period based on the pulse signal from the pulse generator 211 so as to be supplied to the adder 223.

The adder 223 adds the modulated signal from the R-Y modulator 221 and the modulated signal from the B-Y modulator 222 so as to generate a carrier color signal. The carrier color signal is supplied to an adder 224 and a carrier color signal output terminal 225 of a S output terminal.

The Y signal fed to the input terminal 203 is clamped in a clamp circuit 207 and supplied to an adder 226.

The adder 226 adds the Y signal from the clamp circuit 207 and the horizontal and vertical signal from the input terminal 204 for supplying a luminance signal which is added with the sync signal (a monophonic composite video signal) to the adder 224 and to a luminance signal output terminal 227 of the S output terminal.

The adder 224 adds the luminance signal which is added with the sync signal from the adder 226 and the carrier color signal from the adder 223 so as to generate the above-mentioned multi-screen video signal. The multi-screen video signal is supplied to the video output switching circuit 19, as shown in FIG. 1, through the output terminal 228 of the video encoder 43.

The operation of such embodiments will be explained hereinafter.

When both picture images for the main picture and sub-picture screens as well as both audio signals for the main picture and sub-picture screens are recorded together in the recording device such as a VTR, the encoder 43 selects the outputs for the main picture and sub-picture screens from the first and the second scaling-down arrangement to carry out the encode processing for producing the multi-screen video signal capable of parallelly displaying the main picture on the left side and sub-picture on the right screen. The video output switching circuit 19 selects the multi-screen video signal from the encoder 43 to lead the selected one to the video output terminal 54. Thus both the picture images for the main picture and the sub-picture screens are recorded in the recording device connected to the video output terminal 54. On the other hand, since the monophonic converters 41, 42 convert the right channel and left channel audio signals for the main picture and sub-picture screens to respective monophonic audio signals for the main picture and sub-picture screens, the monophonic audio signals of the main picture and sub-picture screens from the monophonic converters 41, 42 are supplied to the right and left channel audio output terminals 55, 56 via the audio output switching circuit 20. Thus the audio signals for the main picture and sub-picture screens are recorded in the recording device connected to the video output terminals 55, 56 as the right channel and left channel audio signals.

According to the embodiments described above, since the picture images and the audio signals for the main picture and sub-picture screens can be recorded in the recording device, it is possible to record two programs in single recording device at the same time or to re-record two programs respectively recorded in separate video tapes into one video tape together. Therefor it will be very useful for the user.

Figure 3:
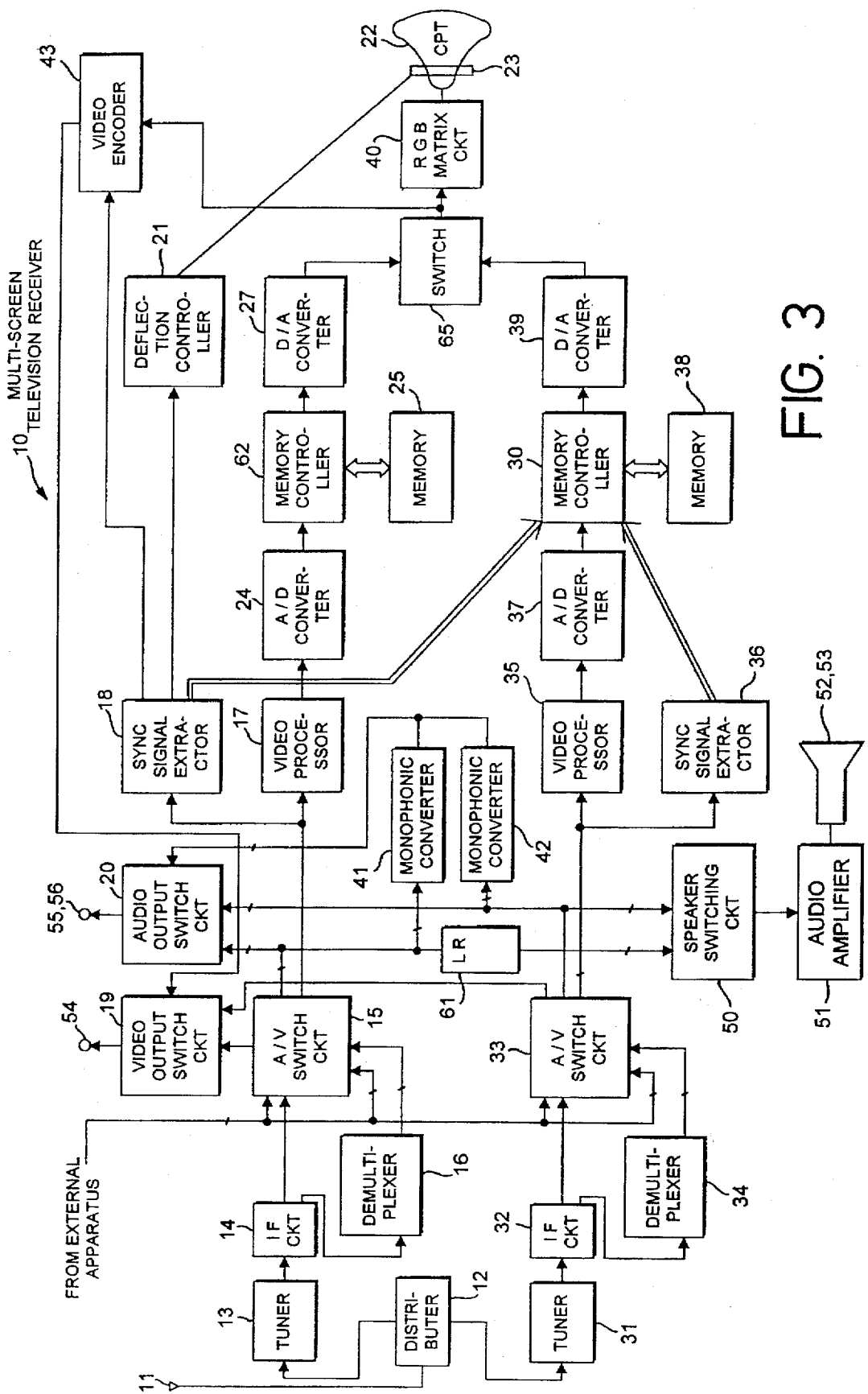
FIG. 3 is block diagram showing another embodiment of the multi-screen television receiver according to the present invention.

FIG. 3 is a block diagram showing another embodiment of the multi-screen television receiver according to the present invention. In FIG. 3 the same elements as those shown in FIG. 1 are assigned with the same references or symbols.

In FIG. 3, a right channel and left channel selection circuit (L/R selector) 61 and a memory controller 62 which can scale up the picture image are defined between the A/V switching circuit 15 and the speaker switching circuit 50 in the multi-screen television receiver 10 of the present embodiment, so that it is possible to select one of the main picture and sub-picture screens from the picture image or audio signal memorized together in the memory device and to display or output it. A switch 65 leads only the signal from the D/A converter 27 to the RGB matrix circuit 40 when one of the recorded main picture and sub-picture screens is selected for outputting the video signal and the audio signal.

The L/R selector 61 supplies right channel and left channel audio signal associated with the main picture screen from the A/V switching circuit 15 to the speaker switching circuit 50 as it is by a key operation on the remote controller, or it selects one of the fourth and fifth combinations where the fourth combination comprises the left channel audio signal in the right channel and left channel audio signal associated with the main picture screen and the fifth combination comprises the right channel audio signals, to selectively supply one of the fourth and fifth combinations to the speaker 50.

The memory controller 62 selects a scaling-down mode, a left half screen scaling-up mode and a right half screen scaling-up mode by the key operation on the remote controller. When the digital signal from the A/D converter 24 is written in and read out from the memory 25, in case of the compression mode the memory controller 62 reads out the digital signal from the memory 25 by scaling down the time axis of the picture in the horizontal direction into one half, in the case of the left half screen scaling-up mode it reads out the digital signal in the memory area of the left half screen of the memory 25 by scaling up the time axis of the picture in the horizontal direction twice, and in the case of the right half screen scaling-up mode it reads out the digital signal in the memory area of the left half screen of the memory 25 by scaling up the time axis of the picture in the horizontal direction twice. Therefore, the A/D converter 24, the memory 25, memory controller 62 and the D/A converter 27 comprises a scaling-up arrangement for extracting and scaling up the half screen output from the video processor 17 and supplying the scaled-up output to the switch 65 as a substitute for the scaled-down output from the video processor 17.

Figure 4:
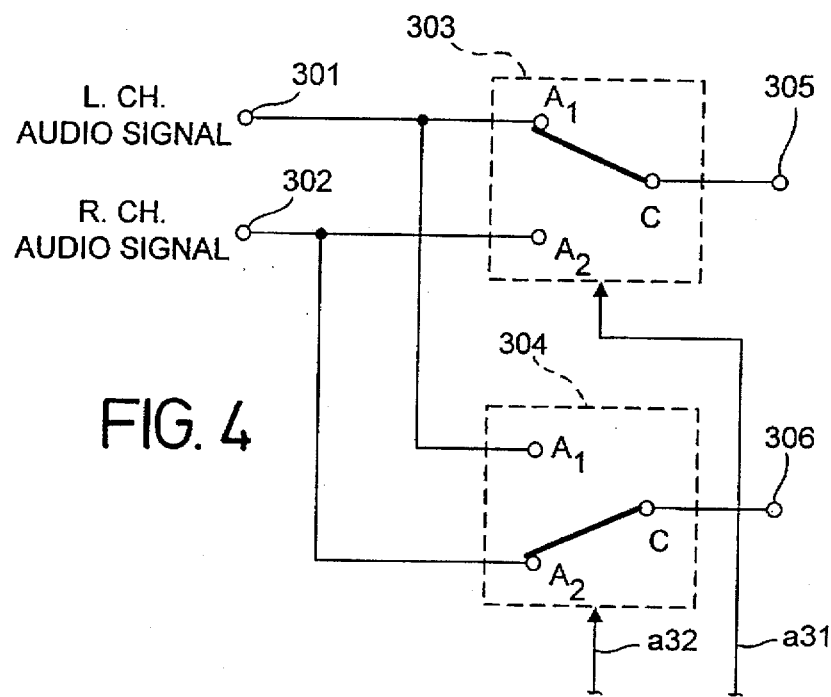
FIG. 4 is circuit diagram showing the L/R selector in FIG. 3.

FIG. 4 is a circuit diagram showing the L/R selector 61, as shown in FIG. 3.

In FIG. 4, the right and left channel audio signals from the A/V switching circuit 15 are supplied to input terminals 301, 302 of the L/R selector 61. The input terminals 301, 302 are connected to each first and second input terminals A1, A2 of a switch 303 and also connected to first and second input terminals A1, A2 of a switch 304. common terminals of the switches 303, 304 are connected to each input terminals 305, 306 of the L/R selector 61.

The switches 303, 304 are controlled by control signals a31, a32 from a micro-processor of the multi-screen television receiver.

The controls of the switches 303, 304 in this case are based on the key operation of the remote controller. The controls are switched and selected according to the scaling-down mode which is a normal condition, the left half screen scaling-up mode and the right half screen scaling-up mode, as shown in the TABLE 1 as cited below.

TABLE 1

| SCALING MODE | LEFT HALF SCREEN SCALING-UP MODE | RIGHT HALF SCREEN SCALING-UP MODE |
|---|---|---|
| SWITCH 303 | A1 | A1 | A2 |
| SWITCH 304 | A2 | A1 | A2 |

Figure 5:
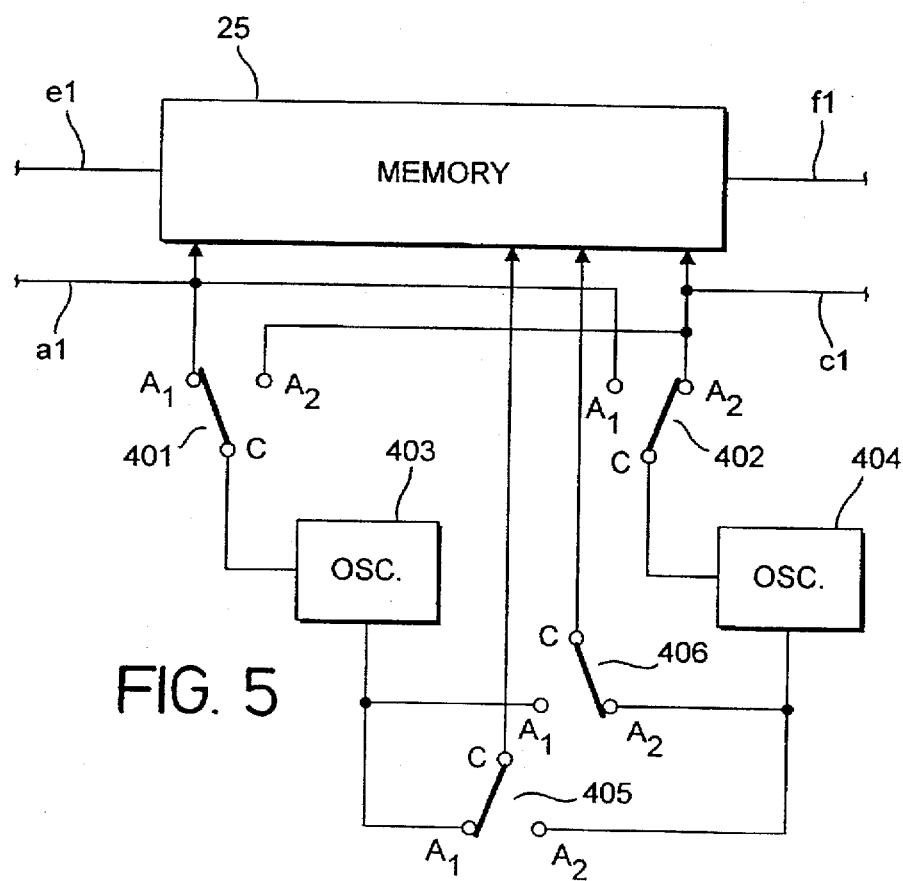
FIG. 5 is a block diagram showing the arrangement of the memory controller and the memory in FIG. 4.
Figure 6:
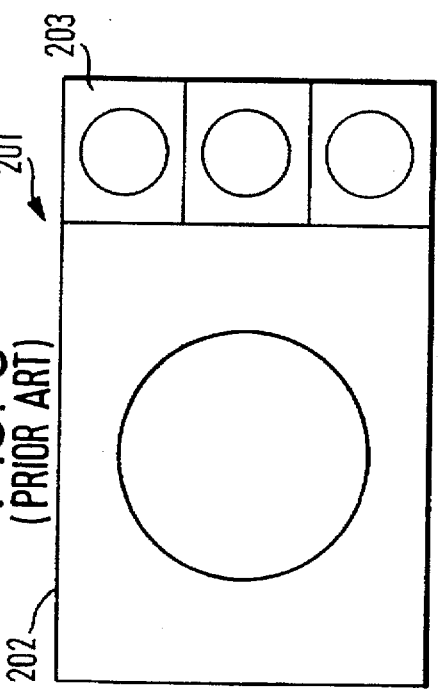
FIG. 6 is a diagram illustrating a first conventional multi-screen display system.
Figure 7:
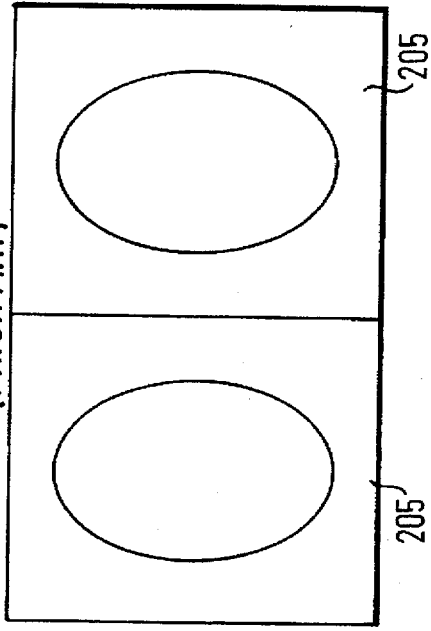
FIG. 7 is a diagram illustrating a second conventional multi-screen display system.
Figure 8:
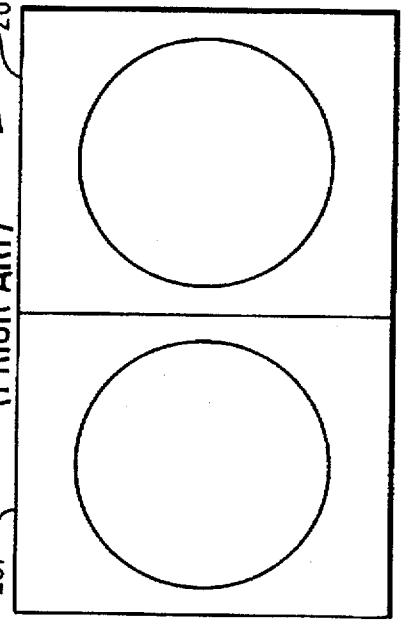
FIG. 8 is a diagram illustrating a third conventional multi-screen display system.
Figure 9:
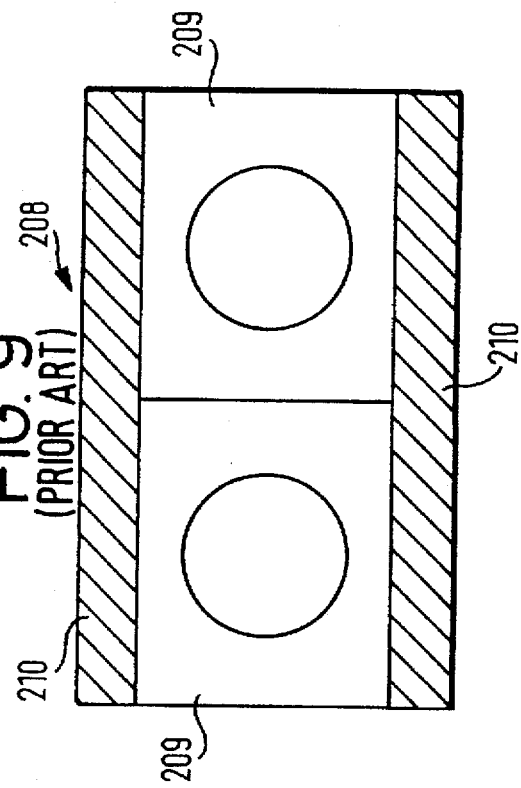
FIG. 9 is a diagram illustrating a fourth conventional multi-screen display system.
Figure 10:
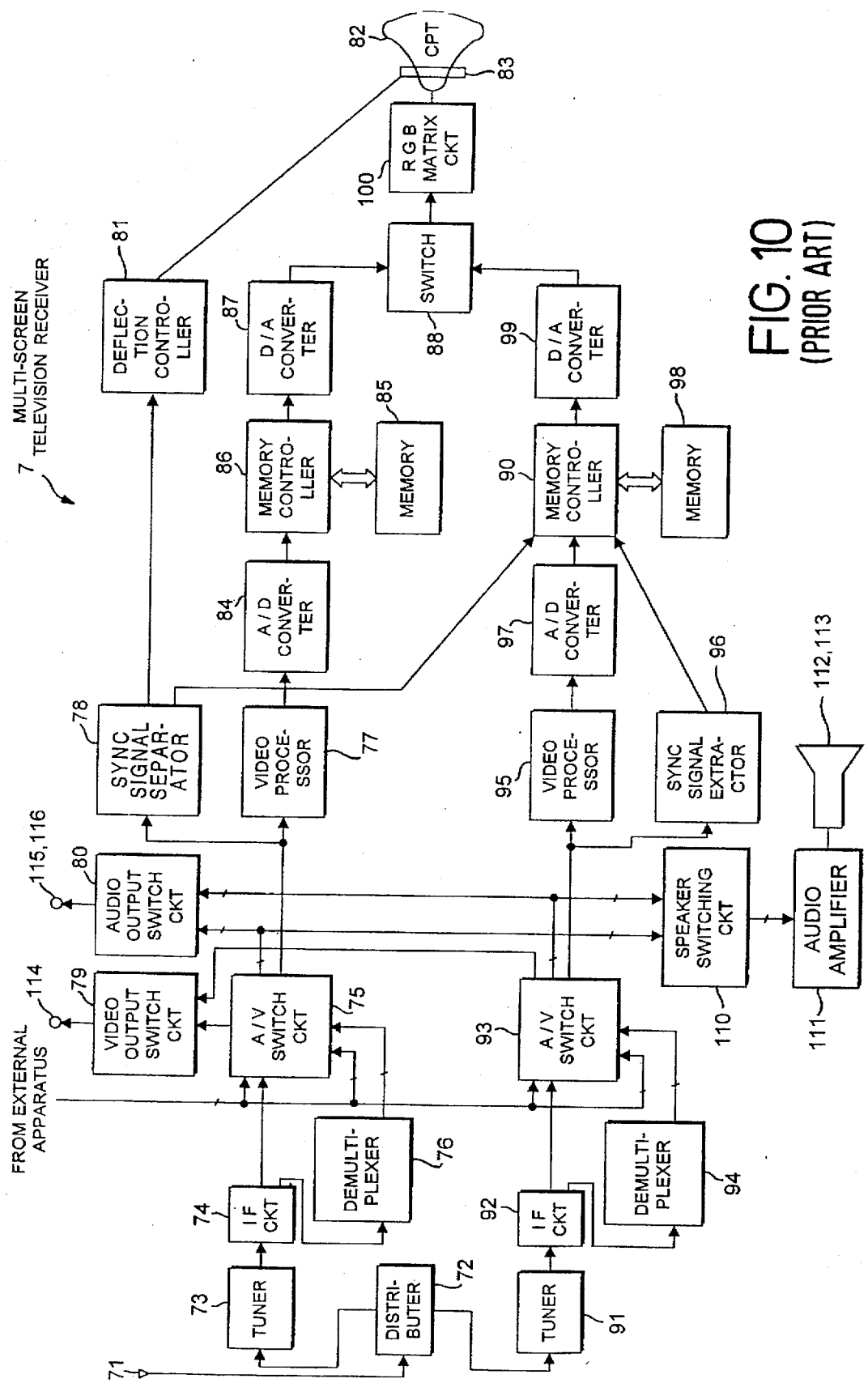
FIG. 10 is a block diagram showing a conventional multi-screen television receiver.
Figure 11:
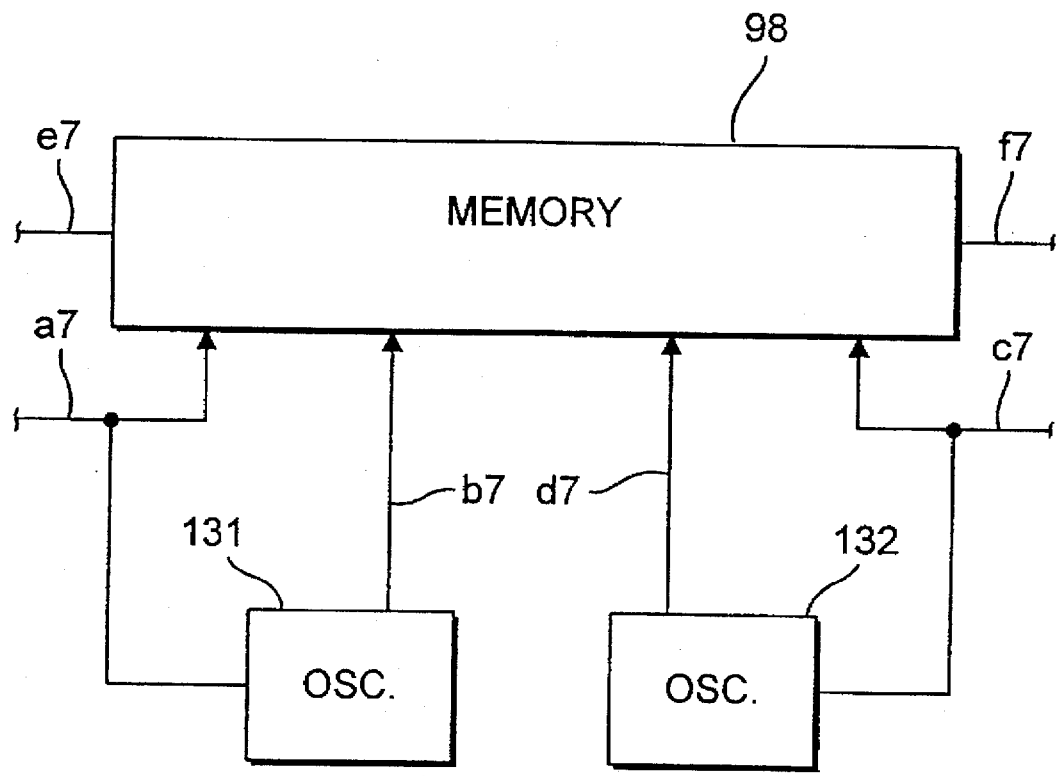
FIG. 11 is a block diagram showing the arrangement of the memory controller and the memory in FIG. 10.

FIG. 5 is a block diagram showing the arrangement of the memory controller 62 and the memory 25, as shown in FIG. 3. For simplification the explanation the circuit for operating the write-in and read-out of the multi-screen display mode and the left side scaling-up mode is made for one line.

In FIG. 5, a horizontal write-in timing signal a1 from the sync signal extractor 18 (not shown in FIG. 1) is supplied to the memory 25 and also led to first input terminals A1 of the switches 401, 402. A horizontal read-out timing signal c1 from the sync signal extractor 18 (not shown in FIG. 1) is supplied to the memory 25 and also led to second input terminals A2 of the switches 401, 402. The common terminal C of the switches 401, 402 are connected to input terminals of oscillators 403, 404. The oscillator 403 oscillates a signal with a frequency m times as much as a signal supplied to its input terminal by a trailing edge of the signal supplied to its input terminal as a pulse leading edge for supplying the oscillation signal to first input terminals A1 of switches 405, 406. The oscillator 404 oscillates a signal with a frequency 2 m times as much as a signal supplied to its input terminal by a trailing edge of the signal supplied to its input terminal as a pulse leading edge for supplying the oscillation signal to second input terminals A2 of the switches 405, 406. The common terminals C of the switches 405, 406 are connected to the write-in clock input terminal and the read-out clock input terminal of the memory 25.

The memory 25 resets its write-in starting area to the beginning area of the horizontal line by the horizontal write-in timing signal a1 and writes in the digital signal e1 which is A/D-converted from the video signal from the A/D converter 24 in synchronism with the clock from the common terminal C of the switch 405, and resets its read-out position of the memory area to the beginning area of the horizontal line by the horizontal read-out timing signal c1 and reads out in synchronism with the clock from the common terminal C of the switch 406, so as to supply the digital signal f1 to the D/A converter 27. Since the memory 25 resets its write-in starting area of the 1 horizontal line to the beginning area of the horizontal line by only the horizontal write-in timing signal al if a digital signal associated with the right half screen image in case of the left half screen scaling-up mode the area storing the digital signal associated with the left half screen is not changed to the digital signal associated with the right half screen.

Here, in case of the right half screen scaling-up mode the horizontal write-in timing signal al is delayed one half horizontal interval and supplied to the memory and the switch.

The controls of the switches 401, 402, 405 and 406 are controlled by the microprocessor of the multi-screen television receiver based on the key operation of the remote control device. Selections shown in the following TABLE 2 are carried out according to the scaling-down mode which is a normal condition, the left half screen scaling-up mode and the right half screen scaling-up mode.

TABLE 2

| | SCALING MODE | LEFT HALF SCREEN SCALING-UP MODE | LEFT HALF SCREEN SCALING-UP MODE |
|---|---|---|---|
| SWITCH 401 | A1 | A2 | A2 |
| SWITCH 402 | A2 | A1 | A1 |
| SWITCH 405 | A1 | A2 | A2 |
| SWITCH 406 | A2 | A1 | A1 |

According to such operation, in the case of the left half screen scaling-up mode and the right half screen scaling-up mode compared with the scaling-down mode, the operations of the write-in clock and the read-out clock in the memory 25 are reversed, the A/D converter 25, the memory 25, the memory controller 62 and the D/A converter 27 extract the half screen in the output from the video processor 17 scale up and supply it to the switch 28.

Here, although the explanation is not shown in FIG. 5, the memory 25 having the memory capacity for one frame resets the horizontal line area which starts writing-in by the vertical write-in signal of the odd number field to the horizontal line area of the beginning of the frame and also resets the horizontal line area which start reading-out the memory area by the vertical read-out timing signal of the odd frame to the horizontal area of the beginning of the frame.

In such embodiments, when it performs the same operation as the embodiment shown in FIG. 1, the switch 303, as shown in FIG. 4, selects the first input terminal A1, the switch 304, as shown in FIG. 4, selects the second input terminal A2, the switches 401, 405, as shown in FIG. 5, select the first input terminals A1, A1 and the switches 402, 406, as shown in FIG. 5, select the second input terminals A2, A2 under the control of the microprocesser of the multi-screen television receiver. Therefore, the circuit connects the same way as that of FIG. 1, and it will be possible to perform the same operation, so that it is possible to record the picture images and the audio signals for the main picture and sub-picture screens in the recording device together.

Next, the operation in which only the main picture screen is selected between the picture image and the audio signal associated with the main picture and sub-picture screens recorded in the recording device together will be explained hereinafter.

In this case, the switch 303, as shown in FIG. 4, selects the first input terminal A1, the switch 304, as shown in FIG. 4, selects the second input terminal A1, the switches 401, 405, as shown in FIG. 5, select the second input terminals A2, A2 and the switches 402, 406, as shown in FIG. 5 select the first input terminals A1, A1. In this state, since the speaker switching circuit 50 supplies the audio signal from the output terminals 305, 306 of the L/R selector 61 to the audio amplifier 51 an audio signal associated with the main screen recorded as the left channel audio signal from the right channel and left channel speakers 52, 53 is output. And, the A/D converter 24, the memory 25, the memory controller 62 and the D/A converter 27 turn to the left half screen scaling-up mode so as to extract the left half screen in the output from the video processor 17, scale up and supply it to the switch 65. In this case, since the switch 65 leads only a signal from the D/A converter 27 to the RGB matrix circuit 40, only the main picture ie displayed on the CPT 22.

Next, the operation in which only the sub-picture screen is selected between the video image and the audio signal associated with the main picture and sub-picture screens recorded in the recording device together will be explained hereinafter.

In this case, the switch 303, as shown in FIG. 4, selects the first input terminal A2, the switch 304, as shown in FIG. 4, selects the second input terminal A2, the switches 401, 405, as shown in FIG. 5, select the second input terminals A2, A2 and the switches 402, 406, as shown in FIG. 5, select the first input terminals A1, A1. In this state, since the speaker switching circuit 50 supplies the audio signal from the output terminals 305, 306 of the L/R selector 61 to the audio amplifier 51, an audio signal associated with the sub-screen recorded as the right channel audio signal from the right channel and left channel speakers 52, 53 is output. And, the A/D converter 24, the memory 25, the memory controller 62 and the D/A converter 27 turn to the right half screen scaling-up mode so as to extract the right half screen in the output from the video processor 17, scale up and supply it to the switch 65. In this case, since the switch 65 leads only a signal from the D/A converter 27 to the RGB matrix circuit 40, only the sub-picture is displayed on the CPT 22.

Here, in the embodiment shown in FIG. 3, the L/R selector and the scaling-up arrangement for scaling up the screen are defined on the series of the circuit of the main screen. However, these can be defined on the series of the circuits for the sub-picture screen or on both the series of the circuits for the main picture and sub-picture screens.

As described above, since the multi-screen television receiver according to the present invention can record the video image and the audio signal associated with both the main picture and sub-picture screen in the recording device with forms suited therefor, it will be possible to record two programs in one recording device at the same time or to record two programs in the separate video tapes in one video tapes together. Therefore, it becomes highly useful for users.

As described above, the present invention can provide an extremely preferable means for recording both the main picture and the sub-picture.

While there ha illustrated and described what are at present considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation or material to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

The foregoing description and the drawings are regarded by the applicant as including a variety of individually inventive concepts, some of which may lie partially or wholly outside the scope of some or all of the following claims. The fact that the applicant has chosen at the time of filing of the present application to restrict the claimed scope of protection in accordance with the following claims is not to be taken as a disclaimer or alternative inventive concepts that are included in the contents of the application and could be defined by claims differing in scope from the following claims, which different claims may be adopted subsequently during prosecution, for example, for the purposes of a divisional application.

What is claimed is:

1. A multi-screen television receiver capable of simultaneously displaying a first video signal and a second video signal on a main picture screen and a sub-picture screen of a picture tube, comprising:

video input switching means for selectively outputting a first input video signal associated with the main picture screen and a second input video signal associated with the sub-picture screen from a plurality of video signals;

a first video processing system and a second video processing system for the main picture screen and the sub-picture screen for processing a respective luminance and a respective color of the first video signal and the second video signal from the video input switching means;

first scaling-down means and second scaling-down means for scaling down the pictures of the output signals of the first video processing system and the second video processing system to the respective sizes of the main picture screen and the sub-picture screen;

combining means for combining selected output signals from the first scaling-down means and the second scaling-down means to supply a combined signal to the picture tube;

an encoder for encoding the combined signal from the combining means into a third video signal to be recorded; and video output switching means for selectively outputting one of the first video signal, the second video signal and the third video signal through a video output terminal.

2. A multi-screen television receiver capable of simultaneously displaying a first video signal and a second video signal on a main picture screen and a sub-picture screen of a picture tube, for selectively outputting one of a first set of right channel and left channel audio signals and a second set of right channel and left channel audio signals respectively associated with the main picture screen and the sub-picture screen, comprising:

video input switching means for selectively outputting a first input video signal associated with the main picture screen and a second input video signal associated with the sub-picture screen from a plurality of video signals;

a first video processing system and a second video processing system for the main picture screen and the sub-picture screen for processing a respective luminance and a respective color of the first video signal and the second video signal from the video input switching means;

first scaling-down means and second scaling-down means for scaling down the pictures of the output signals of the first video processing system and the second video processing system to the sizes of the main picture screen and the sub-picture screen;

combining means for combining selected output signals from the first scaling-down means and the second scaling-down means to supply a combined signal to the picture tube;

an encoder for encoding the combined signal from the combining means into a third video signal to be recorded;

video output switching means for selectively outputting one of the first video signal, the second video signal and the third video signal through a video output terminal;

audio input switching means for selectively outputting the right channel and left channel audio signals associated with the main picture screen and the right channel and left channel audio signals associated with the sub-picture screen from a plurality of right channel and left channel input audio signals;

monophonic converting means for converting the right channel and left channel audio signals for the main picture screen and the sub-picture screen from the audio input switching means into monophonic audio signals for the main picture screen and the sub-picture screen; and audio output switching means for selectively outputting one of a first combination, a second combination, and a third combination and for outputting the selected one combination through an audio output terminal;

the first combination comprises the right channel and left channel audio signals associated with the main picture screen from the audio input switching means;

the second combination comprises the right channel and left channel audio signals associated with the sub-picture screen from the audio input switching means; and the third combination comprises the monophonic audio signals for the main picture screen and the sub-picture screen from the monophonic converting means.

3. The multi-screen television receiver as in claim 2 further comprising:

right channel and left channel selection means for selecting one of a fourth combination and a fifth combination and for outputting the selected one of the fourth combination and the fifth combination to the audio output terminal in place of the first combination and the second combination;

the fourth combination comprises a left channel audio signal in one of the right channel and left channel audio signals among the plurality of right channel and left channel input audio signals; and the fifth combination comprises a right channel audio signal of one of the right channel and left channel audio signals among the plurality of right channel and left channel input audio signals.

4. The multi-screen television receiver as in claim 2 further comprising:

a scaling-up means for scaling up a half picture screen in at least one of the outputs of the first video processing system and the second video processing system and for supplying a scaled-up output to the combining means instead of a scaled-down output of the first video processing system and the second video processing system from the first scaling-down means and the second scaling-down means.

5. The multi-screen television receiver as in claim 4 wherein:
   each of the first scaling down means and the second scaling-down means comprises an analog-digital converter for converting the outputs of the first video processing system and the second video processing system into digital signals;
   a memory for storing the output of the analog-digital converter and a digital-analog converter for converting an output read out from the memory into an analog signal; and
   the scaling-up means reverses the relation of a write-in clock and a read-out clock of the memory so that extracted and scaled-up half pictures in at least one of the outputs of the first video processing system and the second video processing system is supplied to the combining means.

6. A multi-screen television receiver capable of simultaneously displaying a first video signal and a second video signal on a main picture screen and a sub-picture screen of a picture tube, comprising:
   a video input switch permitting selective outputting of a first input video signal associated with the main picture screen and a second input video signal associated with the sub-picture screen from a plurality of video signals;
   a first video processing system and a second video processing system for the main picture screen and the sub-picture screen for processing a respective luminance and a respective color of the first video signal and the second video signal from the video input switch;
   a first picture down-scaler being operable to scale down the pictures of the output signal from the first video processing system to the size of the main picture screen;
   a second picture down-scaler being operable to scale down the pictures of the output signal from the second video processing system to the size of the sub-picture screen;
   a signal combiner being operable to combine selected output signals from the first picture down-scaler and the second picture down-scaler and to supply a combined signal to the picture tube;
   an encoder for encoding the combined signal from the signal combiner into a third video signal to be recorded; and
   a video output switch permitting selective outputting of one of the first video signal, the second video signal and the third video signal through a video output terminal.

7. A multi-screen television receiver capable of simultaneously displaying a first video signal and a second video, signal on a main picture screen and a sub-picture screen of a picture tube, for selectively outputting one of a first set of right channel and left channel audio signals and a second set of right channel and left channel audio signals respectively associated with the main picture screen and the sub-picture screen, comprising:
   a video input switch being operable to permit selective outputting of a first input video signal associated with the main picture screen and a second input video signal associated with the sub-picture screen from a plurality of video signals;
   a first video processing system for the main picture screen for processing a luminance and a color of the first video signal from the video input switch;
   a second video processing system for the sub-picture screen for processing a luminance and a color of the second video signal from the video input switch;
   a first picture scaler being operable to scale down the pictures of an output signal of the first video processing system to the size of the main picture screen;
   a second picture scaler being operable to scale down the pictures of an output signal of the second video processing system to the size of the sub-picture screen;
   a signal combiner being operable to combine selected output signals from the first picture scaler and the second picture scaler and to supply a combined signal to the picture tube;
   an encoder for encoding the combined signal from the signal combiner means into a third video signal to be recorded;
   a video output switch permitting selective outputting of one of the first video signal, the second video signal and the third video signal through a video output terminal;
   an audio input switch permitting selective outputting of the right channel and left channel audio signals associated with the main picture screen and the right channel and left channel audio signals associated with the sub-picture screen from a plurality of right channel and left channel input audio signals;
   an audio monophonic converter being operable to convert the right channel and left channel audio signals for the main picture screen and the sub-picture screen from the audio input switch into monophonic audio signals for the main picture screen and the sub-picture screen; and
   an audio output switch permitting selective outputting of one of a first combination, a second combination, and a third combination and for outputting the selected one combination through an audio output terminal;
   the first combination comprises the right channel and left channel audio signals associated with the main picture screen from the audio input switch;
   the second combination comprises the right channel and left channel audio signals associated with the sub-picture screen from the audio input switch; and
   the third combination comprises the monophonic audio signals for the main picture screen and the sub-picture screen from the audio monophonic converter.

8. The multi-screen television receiver as in claim 7 further comprising:
   a right channel and left channel selector being operable for selecting one of a fourth combination and a fifth combination and for outputting the selected one of the fourth combination and the fifth combination to the audio output terminal in place of the first combination and the second combination;
   the fourth combination comprises a left channel audio signal in one of the right channel and left channel audio signals among the plurality of right channel and left channel input audio signals; and
   the fifth combination comprises a right channel audio signal of one of the right channel and left channel audio signals among the plurality of right channel and left channel input audio signals.

9. The multi-screen television receiver as in claim 7 further comprising:
   a picture up-scaler being operable to scale up a half picture screen in at least one of the outputs of the first video processing system and the second video processing system and to supply a scaled-up output to the signal combiner instead of a scaled-down output of the first video processing system and the second video processing system from the first picture scaler and the second picture scaler.

10. The multi-screen television receiver as in claim 9 wherein:

each of the first picture scaler and the second picture scaler is comprised of an analog-digital converter being operable to convert the outputs of the first video processing system and the second video processing system into digital signals;

a memory for storing the output of the analog-digital converter and a digital-analog converter being operable to convert an output read out from the memory into an analog signal; and the picture up-scaler reverses the relation of a write-in clock and a read-out clock of the memory so that extracted and scaled-up half pictures in at least one of the outputs of the first video processing system and the second video processing system is supplied to the signal combiner.

* * * * *